United States Patent
Murasaki et al.

(10) Patent No.: US 10,220,811 B2
(45) Date of Patent: Mar. 5, 2019

(54) BUCKLE DEVICE

(71) Applicant: KABUSHIKI KAISHA TOKAI-RIKA-DENKI-SEISAKUSHO, Aichi-ken (JP)

(72) Inventors: Tatsuhiro Murasaki, Aichi-ken (JP); Takuhiro Saito, Aichi-ken (JP); Yasunori Hata, Aichi-ken (JP); Yusuke Watada, Aichi-ken (JP); Koji Hayashi, Aichi-ken (JP); Makoto Matsuzaki, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 150 days.

(21) Appl. No.: 15/410,284

(22) Filed: Jan. 19, 2017

(65) Prior Publication Data

US 2017/0232927 A1    Aug. 17, 2017

(30) Foreign Application Priority Data

Jan. 22, 2016    (JP) ................................. 2016-010974

(51) Int. Cl.
 *B60R 22/20*    (2006.01)
 *A44B 11/25*    (2006.01)
 (Continued)

(52) U.S. Cl.
 CPC .......... *B60R 22/20* (2013.01); *A44B 11/2561* (2013.01); *B60R 22/02* (2013.01);
 (Continued)

(58) Field of Classification Search
 CPC ..... B60R 22/18; B60R 22/20; B60R 22/1952; B60R 22/1953; B60R 22/1955;
 (Continued)

(56) References Cited

U.S. PATENT DOCUMENTS 7,828,332 B2 * 11/2010 Bok .................... B60R 22/1952
                                                    180/268
8,814,211 B1 *  8/2014 Kohlndorfer ....... B60R 22/1955
                                                    280/806
2013/0032653 A1  2/2013 Holbein et al.

FOREIGN PATENT DOCUMENTS

JP    H06-065121 U    9/1994
JP    2009-298310 A   12/2009
JP    2014-172487 A    9/2014

OTHER PUBLICATIONS

Office Action issued in the corresponding Japanese Patent Application No. 2016-010974 dated Nov. 14, 2017.

* cited by examiner

*Primary Examiner* — Keith J Frisby
(74) *Attorney, Agent, or Firm* — Roberts Mlotkowski Safran Cole & Calderon P.C.

(57) ABSTRACT

A reduction in the durability of a coupling member coupled to a buckle is suppressed. A lift-up buckle device includes a buckle that engages with a tongue inserted through webbing worn by an occupant, and wires that each have a portion fixed to the buckle and that are displaced to move the buckle. The lift-up buckle device also includes a wire guide that includes a guide groove that guides the wires, and a soft lower cover that engages with the wire guide and covers the wires. A dimension of an end portion on the buckle side of the guide groove is set so as to increase on progression toward the buckle side.

4 Claims, 5 Drawing Sheets

(51) Int. Cl.
*B60R 22/02* (2006.01)
*B60R 22/26* (2006.01)
*B60R 22/18* (2006.01)

(52) U.S. Cl.
CPC ......... *B60R 22/26* (2013.01); *B60R 2022/021* (2013.01); *B60R 2022/1806* (2013.01)

(58) Field of Classification Search
CPC ... B60R 22/03; B60R 22/26; B60R 2022/021; B60R 2022/1806; B60R 2022/1957
USPC .............................. 280/801.2; 297/482, 481
See application file for complete search history.

BUCKLE DEVICE

CROSS-REFERENCE TO RELATED APPLICATION

This application claims priority under 35 USC 119 from Japanese Patent Application No. 2016-010974 filed Jan. 22, 2016, the disclosure of which is incorporated by reference herein.

BACKGROUND

Field of the Invention

The present invention relates to a buckle device.

Related Art

The specification of U.S. Patent Application Publication No. 2013/0032653 describes a buckle device including a buckle that engages with a tongue through which webbing worn by an occupant is inserted. The buckle device includes a motor, a spindle nut that is moved due to the motor being driven, and a cable that connects the spindle nut and the buckle together. The motor is driven and the spindle nut is moved to pull the cable and move the buckle.

In buckle devices in which the buckle is moved repeatedly, it is essential to suppress a reduction in the durability of the cable connected to the buckle.

SUMMARY

In consideration of the above circumstances, a buckle device capable of suppressing a reduction in the durability of a coupling member coupled to a buckle is obtained.

A buckle device of a first aspect includes: a buckle that engages with a tongue through which webbing worn by an occupant is inserted; a coupling member that is fixed to the buckle and that is configured to be displaced to move the buckle; a guide member that includes a guide section guiding the coupling member, a dimension of an end portion of the guide section, which end portion is on a side of the buckle, being set so as to increase on progression toward the side of the buckle; and a first cover that is soft, that engages with the guide member and covers the coupling member, and that is deformed when load is input to the buckle.

A buckle device of a second aspect of the present invention is the buckle device of the first aspect, wherein a second cover that is harder than the first cover engages with the first cover; and the second cover is moved together with the buckle so as to slide with respect to the first cover.

A buckle device of a third aspect of the present invention is the buckle device of the second aspect, an abutting suppression section is provided at the first cover, the abutting suppression section suppressing the second cover from abutting a member, which is disposed at a side of the guide member with respect to the first cover, due to the second cover that is moved toward the side of the guide member engaging with the abutting suppression section.

In the buckle device of the first aspect, the buckle is moved when the coupling member is displaced while being guided by the guide section of the guide member. Note that when external force is input to the buckle, the first cover is deformed by this external force. This enables the buckle to be flexibly displaced when external force is input to the buckle. Here, when the first cover is deformed, the coupling member that passes through inside the first cover is sometimes displaced. Note that in the first aspect, the dimension of the end portion, which is on the buckle side, of the guide section of the guide member is set so as to increase on progression toward the buckle side. Thus, when the coupling member that passes through inside the first cover is displaced, the coupling member and the end portion on the buckle side of the guide section are suppressed from contacting each other, or the contact pressure between the coupling member and the end portion on the buckle side of the guide section is reduced. This enables a reduction in the durability of the coupling member coupled to the buckle to be suppressed.

In the buckle device of the second aspect, the buckle is moved together with the second cover when the coupling member is displaced while being guided by the guide section of the guide member. Note that in the second aspect, the second cover is harder than the first cover. The above configuration enables the buckle to be flexibly displaced when external force has been input to the buckle, and enables the self-supporting properties of the buckle to be secured when external force has not been input to the buckle.

In the buckle device of the third aspect, when the buckle is moved toward the guide member side due to the coupling member being displaced, the second cover that is fixed to the buckle is also moved toward the guide member side. Note that in the third aspect, the abutting suppression section is provided at the end portion on the guide member side of the first cover. This enables the second cover to be suppressed from abutting the member which is disposed on the guide member side with respect to the first cover when the second cover has been moved toward the guide member side.

BRIEF DESCRIPTION OF THE DRAWINGS

Exemplary embodiments of the present invention will be described in detail with reference to the following figures, wherein.

DETAILED DESCRIPTION

Explanation follows regarding a buckle device according to an exemplary embodiment, with reference to FIG. 1 to FIG. 5. Note that in the below explanation, reference to the front, rear, left, right, up, and down directions refers to the front, rear, left, right, up, and down directions as viewed by an occupant seated in a vehicle seat, and the arrow FR indicates the forward direction and arrow UP indicates the upward direction in each of the drawings as appropriate.

Figure 1:
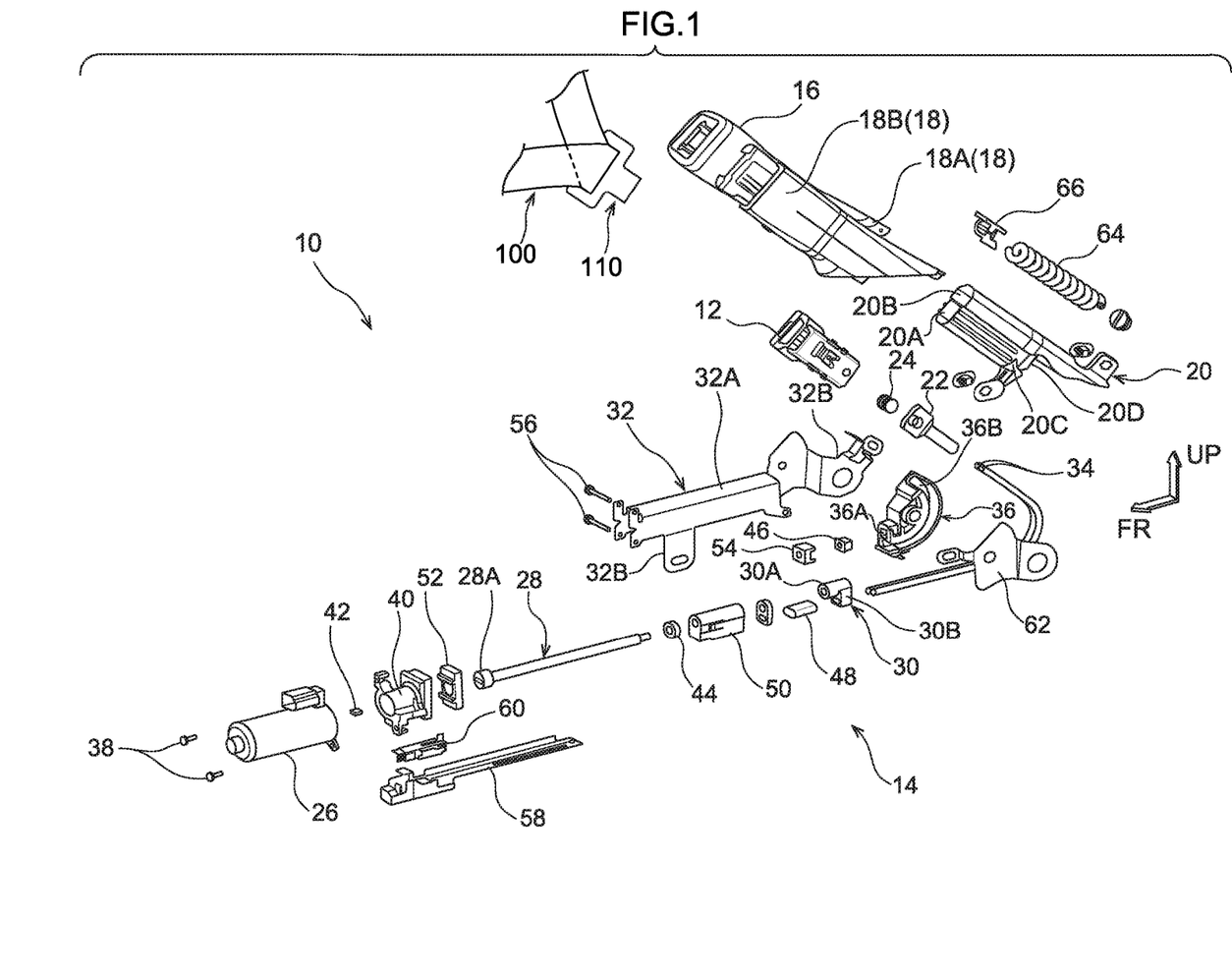
FIG. 1 is an exploded perspective view illustrating a lift-up buckle device.

As illustrated in FIG. 1, a lift-up buckle device 10 serving as a buckle device of the present exemplary embodiment includes a buckle 12 that engages with a tongue 110 through which webbing 100 worn by an occupant is inserted, and a lift-up device 14 that moves the buckle 12 from a housed position to a raised position. The lift-up buckle device 10 also includes a buckle lower cover 18 serving as a second cover and a buckle upper cover 16 attached to the buckle 12, and a lower cover 20 serving as a first cover that supports the buckle lower cover 18 so as to allow sliding.

Buckle 12

The buckle 12 includes a non-illustrated engagement portion that engages with the tongue 110 and a release operation portion that releases this engagement. End portions on one side of a pair of wires 34, described later, are fixed to the buckle 12 through a joint anchor 22 and a rivet 24.

Lift-up Device 14

Figure 2:
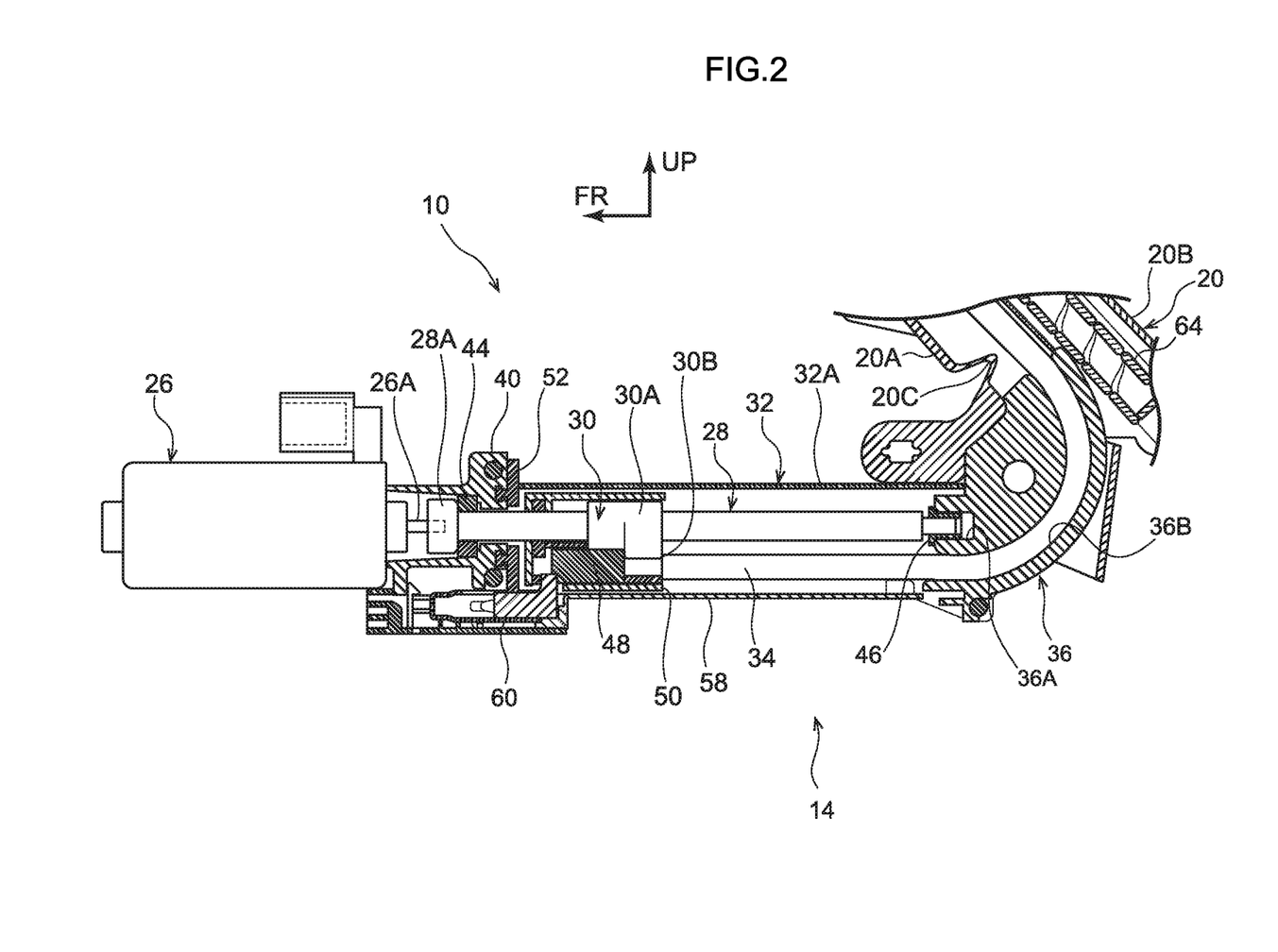
FIG. 2 is a cross-section illustrating a cross-section of a lift-up buckle device.

As illustrated in FIG. 1 and FIG. 2, the lift-up device 14 includes a motor 26 with an output shaft 26A (see FIG. 2) that is capable of rotating toward one side and another side about its axial line direction, a drive screw 28 that engages with the output shaft 26A of the motor 26 so as to be capable of rotating integrally with the output shaft 26A, and a slider 30 that is moved along the axial direction of the drive screw 28 accompanying rotation of the drive screw 28. The lift-up device 14 also includes a rail 32 that guides the slider 30, the pair of wires 34 serve as coupling members, whose end portions on another side are anchored to the slider 30 and which are disposed with an interval therebetween in the seat width direction, and a wire guide 36 serving as a guide member that guides the pair of wires 34.

The motor 26 is a DC motor, and the motor 26 is fixed to a housing 40 through screws 38 and the like.

The drive screw 28 is formed in a rod shape using a steel material or the like. A male thread is formed running along the length direction at an outer peripheral portion of the drive screw 28. One end portion of the drive screw 28 configures an engagement portion 28A that engages with the output shaft 26A of the motor 26. Note that a screw damper 42 formed using an elastic member is interposed between the engagement portion 28A and the output shaft 26A of the motor 26. A portion on the engagement portion 28A side of the drive screw 28 is supported so as to be capable of rotating by the housing 40 through a bearing 44. Another end portion of the drive screw 28 is supported so as to be capable of rotating by a shaft support hole 36A formed in the wire guide 36, described later, through a bushing 46 formed using a resin material or the like.

The slider 30 is formed using a metal material. The slider 30 is configured including a drive screw engagement portion 30A including a female thread portion that screws together with the male thread portion formed to the drive screw 28, and a wire fixing portion 30B through which the wires 34 are inserted. Caulking, crimping or the like is performed in a state in which the another side end portions of the pair of wires 34 have been inserted through the wire fixing portion 30B, such that the another side end portions of the wires 34 do not come out from the wire fixing portion 30B (such that a state in which the another side end portions of the wires 34 are anchored to the wire fixing portion 30B is secured). Note that a piece 48 is fixed to the another side end portions of the wires 34. A shoe 50, which is formed using a resin material or the like and has an outer profile formed in a shape corresponding to the shape of the inside of the rail 32, described later, is attached to the slider 30. The slider 30 moves together with the shoe 50 inside the rail 32. Note that a position of the buckle 12 in a state in which the slider 30 and the shoe 50 are positioned on the housing 40 side (the state illustrated in FIG. 2) is referred to as the "housed position", whereas a position of the buckle 12 in a state in which the slider 30 and the shoe 50 are positioned on the wire guide 36 side is referred to as the "raised position". Dampers 52 and 54 (see FIG. 1) are respectively attached to the housing 40 and the wire guide 36. Thus avoids the shoe 50 moving together with the slider 30 directly abutting the housing 40 and the wire guide 36.

The rail 32 is formed by for example performing pressing process to a steel sheet member. The rail 32 is formed with a substantially U-shaped cross-section open at the lower side, and includes a slider guide portion 32A inside which the drive screw 28, the slider 30, and so on are disposed. The housing 40 is fixed to one length direction side of the slider guide portion 32A of the rail 32 through screws 56 and the like. The wire guide 36, described later, is fixed to another length direction side of the slider guide portion 32A of the rail 32. Note that the rail 32 includes a fixing portion 32B with an insertion hole through which a non-illustrated bolt is inserted. The non-illustrated bolt inserted through the insertion hole of the fixing portion 32B is screwed into a screw hole formed in a seat cushion frame or the like, thereby fixing the lift-up buckle device 10 to the seat cushion frame or the like. A rail cover 58 is attached to the rail 32. An open portion end of the slider guide portion 32A is thereby covered by the rail cover 58. A housed-position detection switch 60 is attached to the rail cover 58. The shoe 50 that moves together with the slider 30 engages with the housed-position detection switch 60, such that detection is made when the buckle 12 is positioned in the "housed position".

Figure 3:
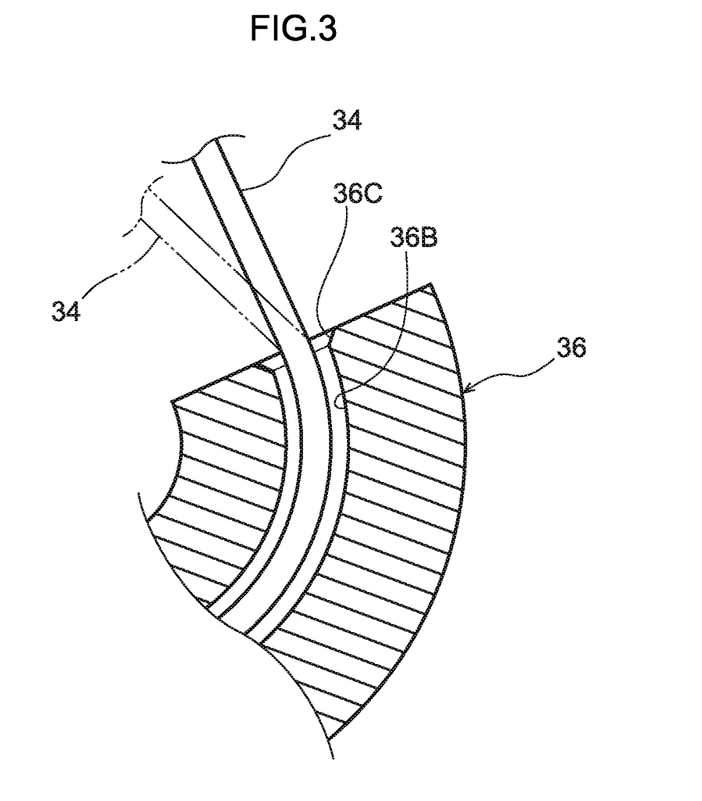
FIG. 3 is an enlarged cross-section illustrating a buckle side end portion of a guide groove formed in a wire guide.

The wire guide 36 is formed in a block shape with a substantially fan shape in a side-on view. The previously-described shaft support hole 36A and a guide groove 36B, serving as a guide section that guides the pair of wires 34, are formed in the wire guide 36. The guide groove 36B is open on one seat width direction side and is formed in a substantially U shape in a side-on view (as viewed from the seat width direction). The depth of the guide groove 36B (a dimension in the seat width direction from an open end to a closed end thereof) is set with a dimension that is slightly larger than a dimension of double the diameter of the wire 34. The pair of wires 34 are disposed inside the guide groove 36B in a state arrayed (side by side) in the depth direction of the guide groove 36B, such that the portions of the pair of wires 34 disposed inside the guide groove 36B are curved in a substantially U shape. Note that in the present exemplary embodiment, the open end side of the guide groove 36B formed in the wire guide 36 is closed off by a cover plate 62, such that the pair of wires 34 do not come out of the guide groove 36B. As illustrated in FIG. 3, an end portion 36C on the buckle 12 (see FIG. 1) side of the guide groove 36B is formed in a tapered shape, such that an internal diameter dimension (internal (inside) dimension) of the end portion 36C on the buckle 12 side of the guide groove 36B increases on progression toward the buckle 12 side. Namely, in the side-on view (as viewed from the seat width direction), a groove width (groove dimension) of the end portion 36C of the guide groove 36B increases on progression toward an end at the buckle 12 side of the guide groove 36B (preferably for example, at the end at the buckle 12 side, the groove width (groove dimension) of the end portion 36C of the guide groove 36B becomes the largest).

Lower Cover 20

As illustrated in FIG. 1 and FIG. 2, the lower cover 20 is formed in a tube shape using an elastic material such as rubber as an example, and one side end portion of the lower cover 20 engages with the wire guide 36. The lower cover 20 includes a wire insertion portion 20A through which the pair of wires 34 are inserted, and a curled cord insertion portion 20B inserted through a curled cord 64 connected to a buckle switch for detecting whether or not the tongue has engaged with the buckle 12. A narrow (neck) portion 20C is formed in a location on the wire guide 36 side of the wire insertion portion 20A. The lower cover 20 can be tilted in the seat front-rear direction by bending the lower cover 20 with the narrow portion 20C as a deformation origin.

Figure 4:
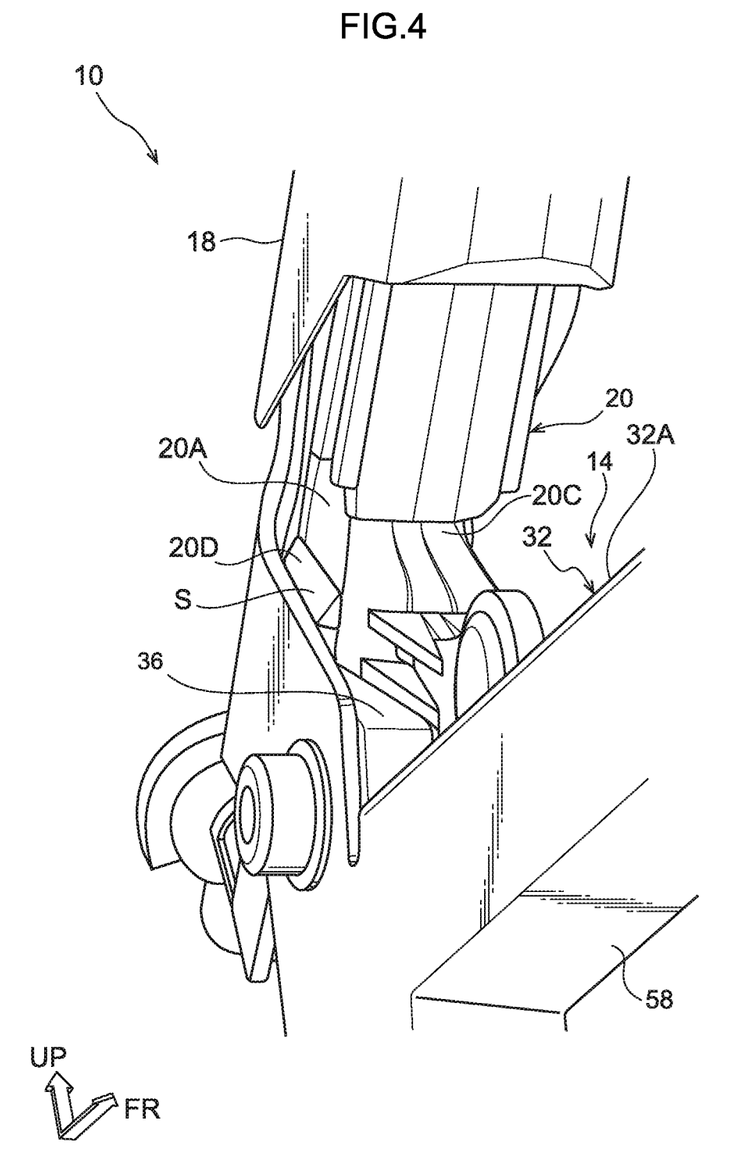
FIG. 4 is an enlarged perspective view illustrating a portion of a lift-up buckle device where a wire guide is provided.
Figure 5:
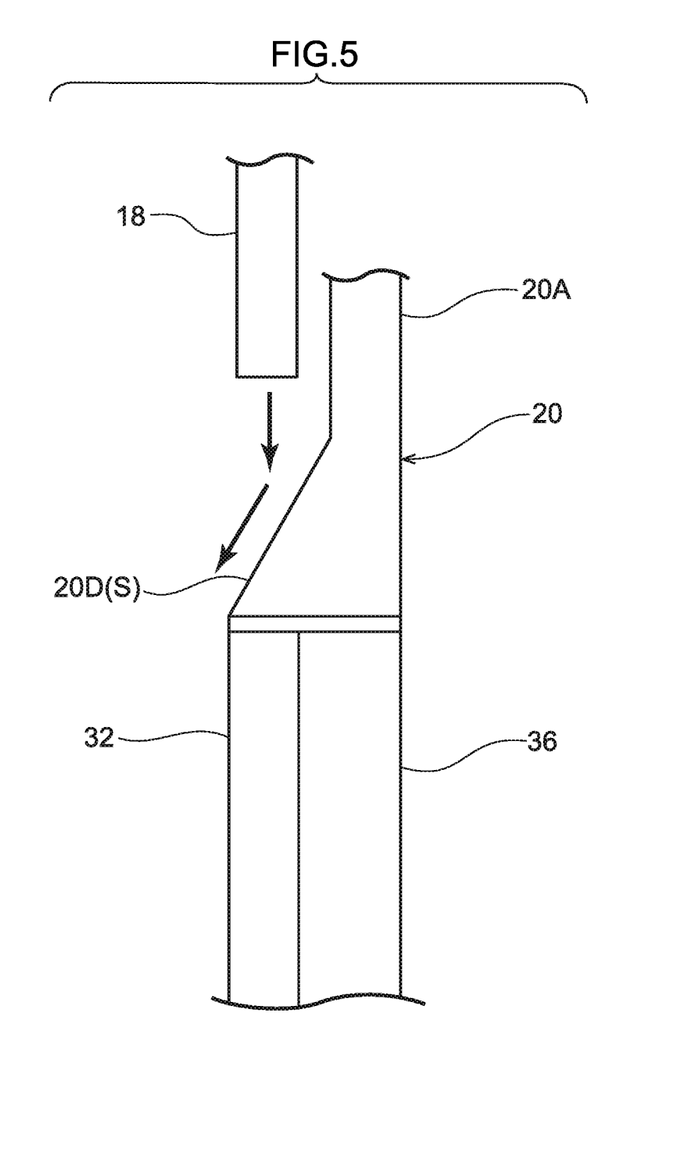
FIG. 5 is an explanatory diagram for explaining operation of a sloped protruding portion provided to a lower cover.

As illustrated in FIG. 4, sloped protruding portions 20D, serving as abutting suppression section formed in protruding shape in the seat width direction, are formed on both seat width direction sides of an end portion on the wire guide 36 side of the wire insertion portion 20A. A face of each sloped protruding portion 20D oriented in the seat width direction (a leading end side face in the projection direction of each sloped protruding portion 20D) configures a sloped face S that slopes in the seat width direction (that slopes toward the projection direction side of the respective sloped protruding portion 20D) on progression toward the wire guide 36 side. As illustrated in FIG. 5, the sloped protruding portion 20D overlaps in the length direction of the lower cover 20 (in the direction in which the buckle lower cover 18 slides with respect to the lower cover 20) and is disposed in close to (adjacent to) a seat width direction end portion of the wire guide 36 and an end of the rail 32.

Buckle Lower Cover 18

As illustrated in FIG. 1, the buckle lower cover 18 is formed using a resin material or the like that is harder than the lower cover 20 as an example. Together with the buckle cover 16, the buckle lower cover 18 covers the buckle 12. The buckle lower cover 18 is formed in a tube shape by joining together an outer cover 18A disposed on one seat width direction side and an inner cover 18B disposed on another seat width direction side. The lower cover 20 is inserted into the buckle lower cover 18, such that the buckle lower cover 18 is capable of sliding along the lower cover 20. Ends on the wire guide 36 side of both seat width direction side portions of the buckle lower cover 18 are sloped with respect to the slide direction of the buckle lower cover 18 relative to the lower cover 20 in a seat side-on view. Note that a curled-cord bracket 66 attached to the curled cord 64 is anchored to the buckle lower cover 18. Thus, the curled cord 64 wound in a spiral shape is stretched-pulled when the buckle lower cover 18 slides away from the wire guide 36 with respect to the lower cover 20.

Operation and Advantageous Effects of Present Exemplary Embodiment

Explanation follows regarding operation and advantageous effects of the present exemplary embodiment.

When an occupant is detected as being seated in the vehicle seat including the lift-up buckle device 10 illustrated in FIG. 1 and FIG. 2, the motor 26 of the lift-up device 14 rotates the drive screw 28 toward the one side. The slider 30 moves along the drive screw 28 due to the drive screw 28 rotating, and the buckle 12 fixed to the one side end portions of the wires 34 is moved toward the seat upper side. Namely, the buckle 12 is moved from the "housed position" to the "raised position". This enables the occupant to easily engage the tongue 110 with the buckle 12. Namely, this enables the occupant to easily put on the webbing 100. When the buckle switch has detected that the tongue 110 has engaged with the buckle 12, the motor 26 of the lift-up device 14 rotates the drive screw 28 toward the another side. The buckle 12 is thereby moved from the "raised position" to the "housed position".

Note that in the present exemplary embodiment, when the lift-up device 14 is actuated, the buckle lower cover 18 inserted with the lower cover 20 moves together with the buckle 12. In the state in which the buckle 12 is positioned in the "raised position", a seat lower side end of the buckle lower cover 18 is positioned further toward the seat lower side than a seat upper side end of the lower cover 20. This suppresses the wires 34 and the curled cord 64 from being seen between the lower cover 20 and the buckle lower cover 18.

As illustrated in FIG. 3, in the present exemplary embodiment, the end portion 36C, which is on the buckle 12 side, of the guide groove 36B formed in the wire guide 36 is formed in a tapered shape. The internal dimension of the end portion 36C on the buckle 12 side of the guide groove 36B accordingly increases on progression toward the buckle 12 side. Thus, when the lower cover 20 is bent (when the lower cover 20 is tilt-moved in the seat front-rear direction) with the narrow portion 20C (see FIG. 2) as the deformation origin point due to the occupant pressing or pushing the buckle 12, the pair of wires 34 connected to the buckle 12 can be suppressed from contacting the end portion 36C on the buckle 12 side of the guide groove 36B, or the contact pressure between the pair of wires 34 and the end portion 36C on the buckle 12 side of the guide groove 36B can be reduced. This enables a reduction in the durability of the pair of wires 34 connected to the buckle 12 to be suppressed, without increasing the size (length and diameter) of the pair of wires 34.

In the present exemplary embodiment, the lower cover 20 is configured to support the buckle lower cover 18. This enables the self-supporting (standing) properties of the buckle 12 to be secured, without the pair of wires 34 contacting the end portion 36C on the buckle 12 side of the guide groove 36B. Moreover, since the buckle lower cover 18 is formed using a harder material than the lower cover 20, the buckle 12 can be flexibly displaced when external force is input to the buckle 12, and the self-supporting properties of the buckle 12 can be secured when external force is not input to the buckle 12.

As illustrated in FIG. 4, in the present exemplary embodiment, the sloped protruding portions 20D formed in protruding shapes in the seat width directions are provided at the end portion on the wire guide 36 side of the lower cover 20. Thus, as illustrated in FIG. 5, when a lower end of the buckle lower cover 18 abuts the sloped face(s) S of the sloped protruding portion(s) 20D when the buckle 12 is moved from the "raised position" to the "housed position", a portion(s) of the lower end of the buckle lower cover 18 abutting the sloped face(s) S of the sloped protruding portion(s) 20D is(are) moved in the seat width direction(s). This enables the lower end of the buckle lower cover 18 to be suppressed from abutting the seat width direction end portion of the wire guide 36 and the end of the rail 32, and enables the buckle 12 to be smoothly moved from the "raised position" to the "housed position". This also enables the occurrence of a striking sound, generated due to the lower end of the buckle lower cover 18 abutting the seat width direction end portion of the wire guide 36 and the end of the rail 32, to be suppressed.

In the present exemplary embodiment, the sloped protruding portion 20D overlaps in the length direction of the lower cover 20 (in the direction in which the buckle lower cover 18 slides with respect to the lower cover 20) and is disposed in close to (adjacent to) the seat width direction end portion of the wire guide 36 and the end of the rail 32. This configuration enables a location of the lower cover 20, which is further toward the upper side than the location where the sloped protruding portion 20D, is formed to be a bending origin (enables the bend location (point) to be stabilized), and enables the engagement between the lower cover 20 and the wire guide 36 to be suppressed from becoming disengaged, when the lower cover 20 is tilted in the seat width direction.

Note that in the present exemplary embodiment, an example has been given in which the sloped protruding portions 20D are provided to the lower cover 20; however, the present invention is not limited thereto. A configuration in which the sloped protruding portions 20D are not provided may be applied in a configuration in which the lower end of the buckle lower cover 18 does not abut the seat width direction end portion of the wire guide 36 and/or the end of the rail 32.

An exemplary embodiment has been explained above; however, the present disclosure is not limited to the above explanation, and obviously various other modifications may be implemented within a range not departing from the spirit of the present disclosure.

What is claimed is:

1. A buckle device comprising:
    a buckle that engages with a tongue through which webbing worn by an occupant is inserted;
    a coupling member that is fixed to the buckle and that is displaceable to move the buckle;
    a guide member that includes a guide section guiding the coupling member; and
    a first cover that engages with the guide member and covers the coupling member, and that is deformed when load is input to the buckle, and
    a second cover that is harder than the first cover and that engages with the first cover, the second cover being moved together with the buckle so as to slide with respect to the first cover,
    wherein the guide section is a groove formed at the guide member, whose depth direction is along a seat width direction, the groove being open on one side in the seat width direction, and
    wherein a groove width dimension at an end portion of the groove, which end portion is on a side of the buckle, is set so as to increase on progression toward the side of the buckle as viewed from the seat width direction.

2. The buckle device of claim 1, wherein:
    an abutting suppression section is provided at the first cover, the abutting suppression section suppressing the second cover from abutting a member, which is disposed at a side of the guide member with respect to the first cover, due to the second cover that is moved toward the side of the guide member engaging with the abutting suppression section.

3. The buckle device of claim 1, wherein the groove of the guide section is U-shaped.

4. The buckle device of claim 1, further comprising:
    an abutting suppression section provided at the first cover including a sloped face which slopes in a seat width direction with respect to a moving direction of the second cover, such that by the second cover being moved toward the guide member, and abutting the sloped surface, a portion of the second cover, which portion abuts the abutting suppression section, is configured to move in the seat width direction.

* * * * *